United States Patent
Dayoub et al.

(10) Patent No.: US 9,849,928 B2
(45) Date of Patent: Dec. 26, 2017

(54) METHOD OF MOUNTING A ROOF PANEL ASSEMBLY

(71) Applicant: Inalfa Roof Systems Group B.V., Venray (NL)

(72) Inventors: Karim Dayoub, Rochester, MI (US); Peter Christiaan Leonardus Johannes Manders, Horst (NL); Joseph Petrus Johannes Sanders, Cuijk (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 258 days.

(21) Appl. No.: 14/540,719

(22) Filed: Nov. 13, 2014

(65) Prior Publication Data

US 2016/0137243 A1 May 19, 2016

(51) Int. Cl.
| | |
|---|---|
| *B62D 65/06* | (2006.01) |
| *B60J 7/02* | (2006.01) |
| *B60J 7/04* | (2006.01) |

(52) U.S. Cl.
CPC ............ *B62D 65/06* (2013.01); *B60J 7/022* (2013.01); *B60J 7/04* (2013.01); *Y10T 29/49622* (2015.01); *Y10T 29/49982* (2015.01)

(58) Field of Classification Search
CPC .. B62D 65/06; B60J 7/04; B60J 7/022; Y10T 29/49826; Y10T 29/49888; Y10T 29/49982; Y10T 29/49622
See application file for complete search history.

(56) References Cited

U.S. PATENT DOCUMENTS

| | | | |
|---|---|---|---|
| 4,998,711 A * | 3/1991 | Borg ................. | B25B 11/00 269/21 |
| 5,052,744 A | 10/1991 | Sugimoto | |
| 5,704,117 A * | 1/1998 | Mok .................. | H05K 9/003 174/371 |
| 6,279,989 B1 | 8/2001 | Marchart et al. | |

(Continued)

FOREIGN PATENT DOCUMENTS

| | | |
|---|---|---|
| EP | 1036684 A2 | 9/2000 |
| JP | 60245540 A * | 12/1985 |
| JP | 2005280529 A | 10/2005 |

OTHER PUBLICATIONS

European Search Report for corresponding European application No. 15190423, dated Apr. 20, 2016.

*Primary Examiner* — Sarang Afzali

(74) *Attorney, Agent, or Firm* — Steven M. Koehler; Westerman, Champlin & Koehler, P.A.

(57) ABSTRACT

A method of mounting a roof panel assembly to a vehicle having a roof opening in its fixed roof includes: mounting a frame of the roof panel assembly to the fixed roof from below with an operating mechanism and a ring frame in a position corresponding to a closed position of the movable panel, providing an amount of paste-like adhering material onto the ring frame distributed around the circumference thereof, positioning the movable panel onto the ring frame from above with the adhering material interpositioned and compressing the adhering material until a correct position with respect to the vehicle roof is reached, and keeping the movable panel in this position until the adhering material is sufficiently hardened to maintain the panel in its position.

20 Claims, 17 Drawing Sheets

(56) References Cited

U.S. PATENT DOCUMENTS

| | | | | |
|---|---|---|---|---|
| 7,144,076 B2* | 12/2006 | Wendler | ................ | B62D 25/06 296/210 |
| 9,340,096 B2* | 5/2016 | Bojanowski | ........... | B60J 7/0084 |
| 2015/0123430 A1 | 5/2015 | Bojanowski | | |

* cited by examiner

METHOD OF MOUNTING A ROOF PANEL ASSEMBLY

BACKGROUND

The discussion below is merely provided for general background information and is not intended to be used as an aid in determining the scope of the claimed subject matter.

In the prior art, roof panel assemblies can be attached to the fixed vehicle roof in different manners. In a first method the completed roof panel assembly is attached to the vehicle roof from below. A disadvantage of this method is that the panel dimensions are limited as the panel must fit into the opening between the roof beams. In another assembling method, the completed roof panel assembly is attached to the vehicle roof from above. The panel dimensions may then be larger than the opening between the vehicle roof beams, but the vehicle roof must be adapted completely to accommodate the frame of the roof panel assembly. This is undesirable. In a third mixed method, the roof panel assembly without the panel or panels is attached to the vehicle roof from below, after which the movable panel is attached to the ring frame on the operating mechanism of the roof panel assembly from above. The panel may then be very large while the frame is attached to the vehicle roof in a conventional manner without large adaptations of the vehicle roof.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention provides a method of mounting a roof panel assembly to a vehicle having a roof opening in its fixed roof, said roof panel assembly comprising a frame, a rigid movable panel supported by the frame through an operating mechanism carrying a ring frame, enabling the panel to move between a closed position closing the roof opening and an open position opening the roof opening at least partly, said method including:
  mounting the frame of the roof panel assembly to the fixed roof of the vehicle from below with the operating mechanism and in ring frame in a position corresponding to the closed position of the movable panel,
  providing an amount of paste-like adhering material onto the ring frame distributed around the circumference thereof,
  positioning the movable panel onto the ring frame from above with the adhering material interpositioned and thereby substantially plastically compressing the adhering material until a correct height with respect to the vehicle roof is reached, and
  keeping the movable panel in this position until the adhering material is sufficiently hardened to maintain the panel in its position.

This method ensures that the panel is fixed to the remainder of the roof panel assembly in a reliable and accurate manner, so that the panel is positioned correctly with respect to the vehicle roof without later adjustments.

In a simple method the correct height of the movable panel is determined by means of spacers provided between the movable panel and the fixed roof. These spacers can be temporary and are then only arranged to provide a base for the panel during the manufacturing process. After hardening of the adhering material the movable panel may be opened by means of the operating mechanism to a position in which the spacers are removed.

In an alternative or additional method the correct position is determined by measuring the position of the movable panel when it is positioned onto the ring frame. Equipment may be used that is already available for measuring the correct position of the wind shields in the vehicle. A front and rear wind shield, said movable panel and a stationary panel may thus be fixed to the vehicle one after the other by adhering material, in particular the rear wind shield may be fixed to the vehicle after the stationary panel, and the front wind shield is fixed to the vehicle after the movable panel.

The operating mechanism may be additionally locked in its closed position by means of a locking member maintaining the position of the ring frame during placement of the movable panel onto this ring frame. Such locking member may help to maintain the position of the ring frame when considerable forces are used to arrange the panel and compress the adhering material on the ring frame. After hardening of the adhering material the movable panel may be opened by means of the operating mechanism to a position in which the locking member is removed. The operating mechanism is then ready for its normal use.

If a sealing member is positioned between a circumferential edge of the movable panel and the vehicle roof when the movable panel is in its closed position, the sealing member is compressed when the movable panel is maintained at its correct height by means of a clamp.

A sub-frame may be fixed to the vehicle roof before the roof panel assembly is fixed the fixed roof, and in this case the sealing member is fixed to the sub-frame. The sub-frame may be adapted to receive this sealing member. This sub-frame then forms part of the fixed vehicle roof.

In an aspect of the invention, the movable panel is kept in position until the adhering material is sufficiently hardened by means of at least two clamping devices, clamping the panel with regard to the vehicle fixed roof. In this manner the panel is kept in position, also if forces from the sealing member or adhering material are exerted on the panel. If a reproducible rebound is to be expected when the clamping devices are removed, the clamping position can be adjusted accordingly.

According to another aspect of the invention, there is provided a roof panel assembly for a vehicle having an opening in its fixed vehicle roof, comprising:
  a frame configured to be fixed to the vehicle roof,
  a longitudinal guide supported by the frame,
  an operating mechanism movably supported by the longitudinal guide,
  a rigid movable panel supported by the operating mechanism through a ring frame, the operating mechanism enabling the panel to move between a closed position closing the roof opening and an open position opening the roof opening at least partly,
  wherein the movable panel is fixed to the ring frame by means of adhering material, the ring frame being attached to the operating mechanism in a non-adjustable manner by means of at least one fixing member which, in the closed position of the panel is positioned below an upper side of the longitudinal guide and is laterally shielded by the guide.

To improve and/or facilitate correct positioning of the movable panel, it may be provided with locating members fitting in locating holes in the fixed roof.

Further details and advantages of aspects of the invention follow from the description with reference to the drawings showing embodiments of the invention by way of example.

BRIEF DESCRIPTION OF THE FIGURES

FIG. 3 shows the stage in which a sub-frame is attached to the vehicle roof, but before the roof panel assembly is mounted.

FIG. 4 shows the stage in which the frame of the roof panel assembly has been fixed to the vehicle roof from below.

FIG. 5 is a sectional view of the vehicle roof and roof panel assembly in the same mounting stage as in FIG. 4, but according to the line V-V in FIG. 1.

FIG. 6 shows the stage in which adhering material is deposited onto a ring frame on an operating mechanism of the roof panel assembly.

FIG. 7 shows the stage in which the movable panel has been positioned on the ring frame of the roof panel assembly.

FIG. 8 shows the stage in which a clamping device holds the panel in position.

FIG. 9 shows the stage in which the clamping device is removed.

FIG. 10 shows the stage in which the headliner is attached to the vehicle roof, and the panel is opened to a position in which the spacers are removed.

FIG. 11 shows the finalized roof panel assembly with its panel in closed position again.

FIG. 12 shows an alternative embodiment of the roof panel assembly in which the panel has been moved to a position in which the connection between panel and operating mechanism can be disconnected.

DETAILED DESCRIPTION OF THE ILLUSTRATIVE EMBODIMENTS

Figure 1:
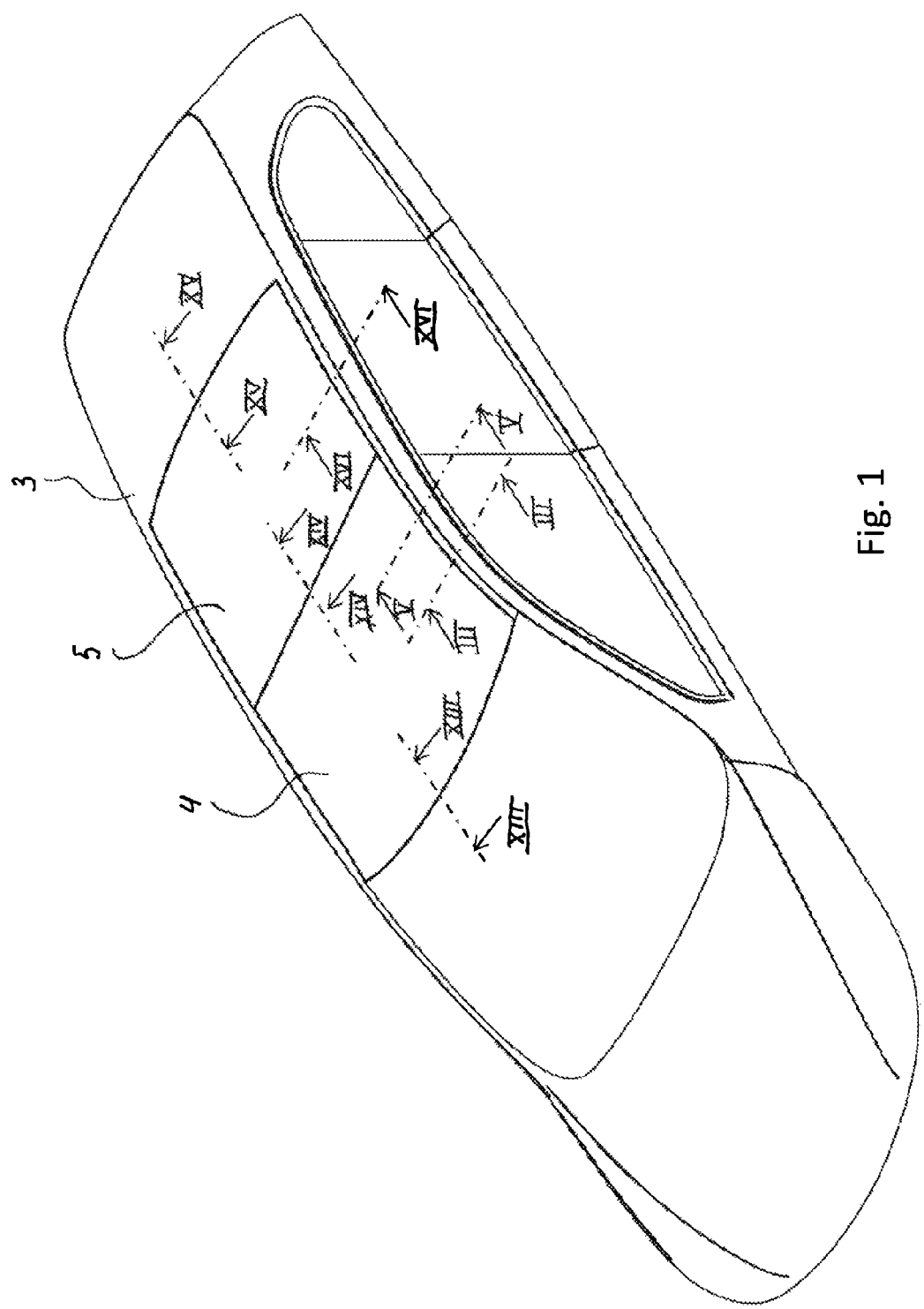
FIG. 1 is a schematic perspective view of a vehicle roof comprising a roof panel assembly.
Figure 2:
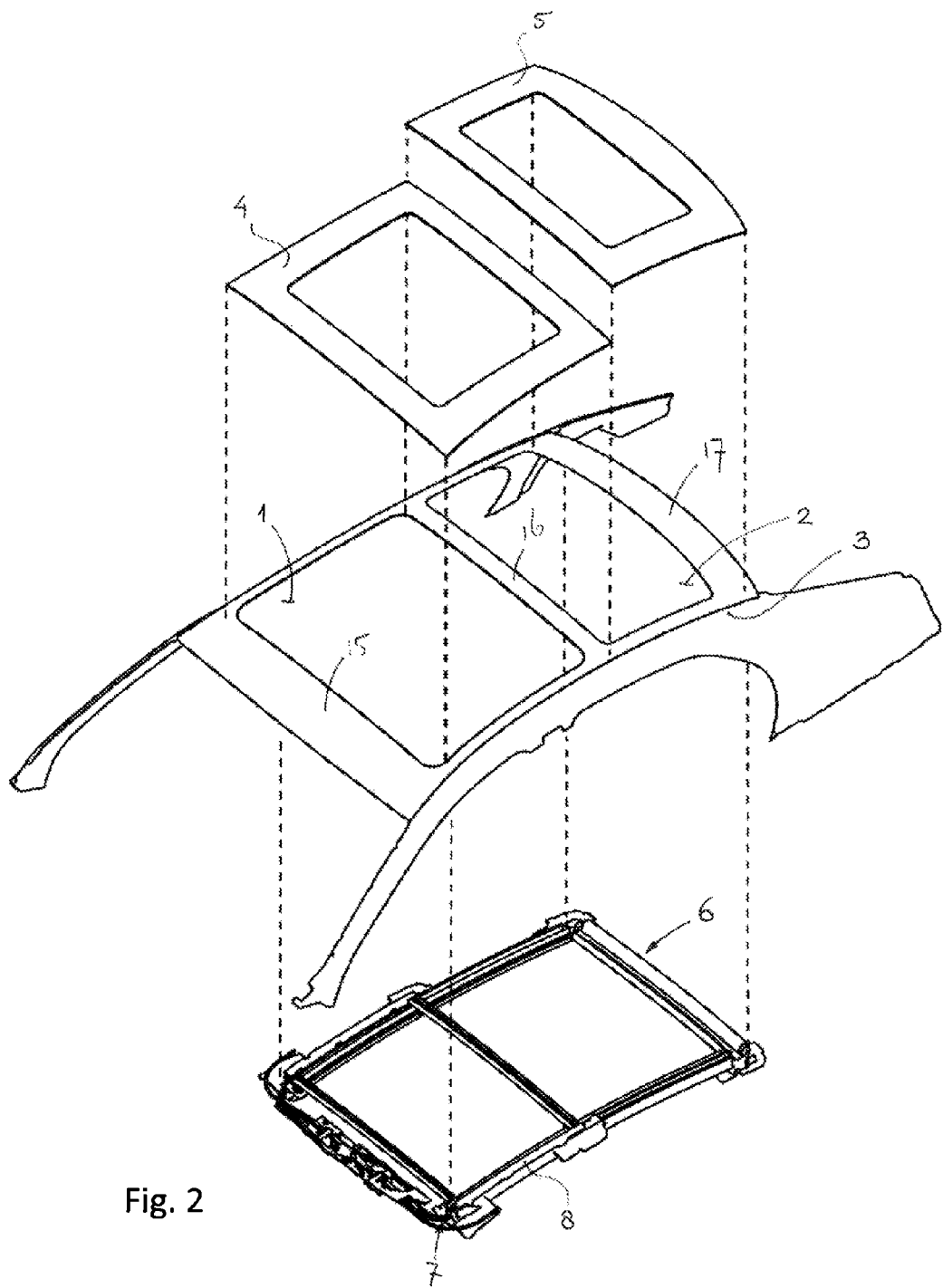
FIG. 2 illustrates very schematically a method of mounting the roof panel assembly to the vehicle roof.

The drawings show an embodiment of an open roof construction for a vehicle, in particular a motor vehicle such as a passenger car. As is shown in FIG. 2, this vehicle is provided with at least one, and in this case two openings 1, 2 in its fixed roof 3. It is also possible to have one large opening which is closed by more than one panel. The fixed roof 3 is an integral part of the vehicle and the roof openings 1, 2 are closed by separate panels 4, 5, respectively. The panels 4,5 are large panels extending substantially the full width of the vehicle (a so called rail-to-rail system extending from one cantrail to the opposite one), so that in closed position of the roof panel assembly, the complete roof appears to be made of glass or other transparent material such as plastic. The front panel 4 is a movable panel, and the rear panel 5 may be movable or in this case a fixed transparent panel allowing light to enter the passenger cabin.

The roof panel assembly comprises a stationary part, such as a frame 6 (FIG. 2) movably supporting an operating mechanism 7 and a ring frame 8 thereon which is used to attach the panel 4 thereto. In this embodiment, panel 4 is movable between a closed position, in which roof opening 1 is closed and panel 4 is substantially coplanar with the fixed roof 2, and an open position, in which panel 4 occupies a rearward position, at least partially above rear panel 5, in which at least a part of opening 1 is cleared.

The operating mechanism 7 is provided on each longitudinal side of panel 4 for effecting the movements of panel 4 (only one shown in the drawings). The mechanism is driven by a driving unit including a driving element, such as a driving cable (not shown) and a manual actuator, such as a crank, or a motor such as an electric motor, for driving the cable. The operating mechanism supports panel 4 and is at least partially guided in a guide rail 9 (FIG. 4), which forms part of or is mounted on frame 6 that is attacked to the vehicle roof. The guide rail 9 extends along each side edge of roof opening 1, at a lower level than fixed roof 2. The structure of frame 9 with operating mechanism 7 is known in the art and not described further here.

In FIG. 2 it is illustrated that the frame 6 with all parts except the panels 4, 5 is attached to the fixed vehicle roof from below in a vertically upward direction, while the panels 4, 5 are attached to either the frame 6 or the fixed roof 3 from above in a vertically downward direction. The mounting method will be described with reference to FIGS. 3-12 illustrating various stages of the mounting method.

Figure 3:
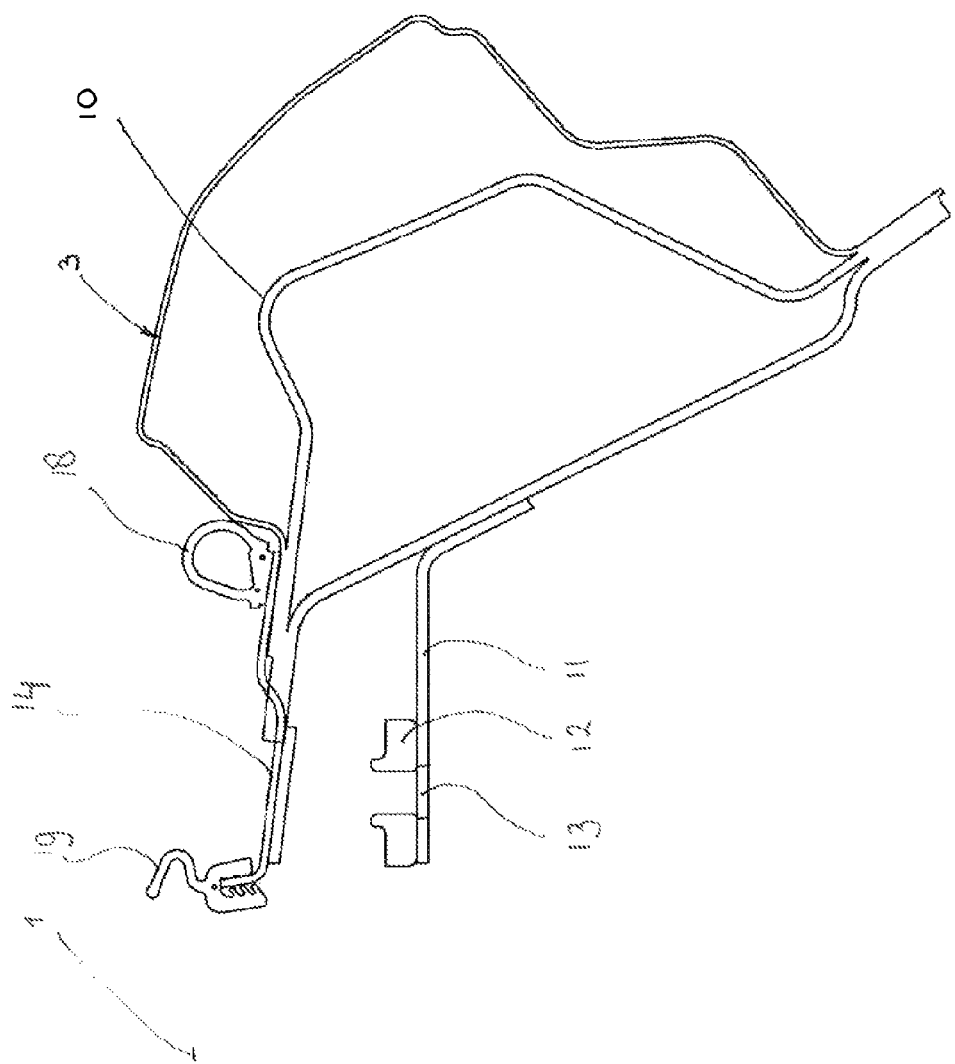
FIGS. 3-12 illustrate the successive stages of mounting the roof panel assembly to the vehicle roof by means of an enlarged sectional view according to the line III-III in FIG. 1.

FIG. 3 shows a part of the fixed roof 3 prepared to receive the roof panel assembly. A side beam (cantrail) 10 of the fixed roof 3 is provided with a flange 11 extending in longitudinal direction and carrying a plurality of nuts 12 fixed thereon around holes 13 in the flanges. A sub-frame 14 extending around the openings 1 and 2 is attached by the car manufacturer to the longitudinal side beams 10 and to transverse beams 15-17 connecting side beams 10. The sub-frame is used to attach seals 18, 19 cooperating with the edge and lower side of panel 4, respectively. For the sake of completeness it is noted that all bulb seals are shown in the drawings in their non-deformed state.

Figure 4:
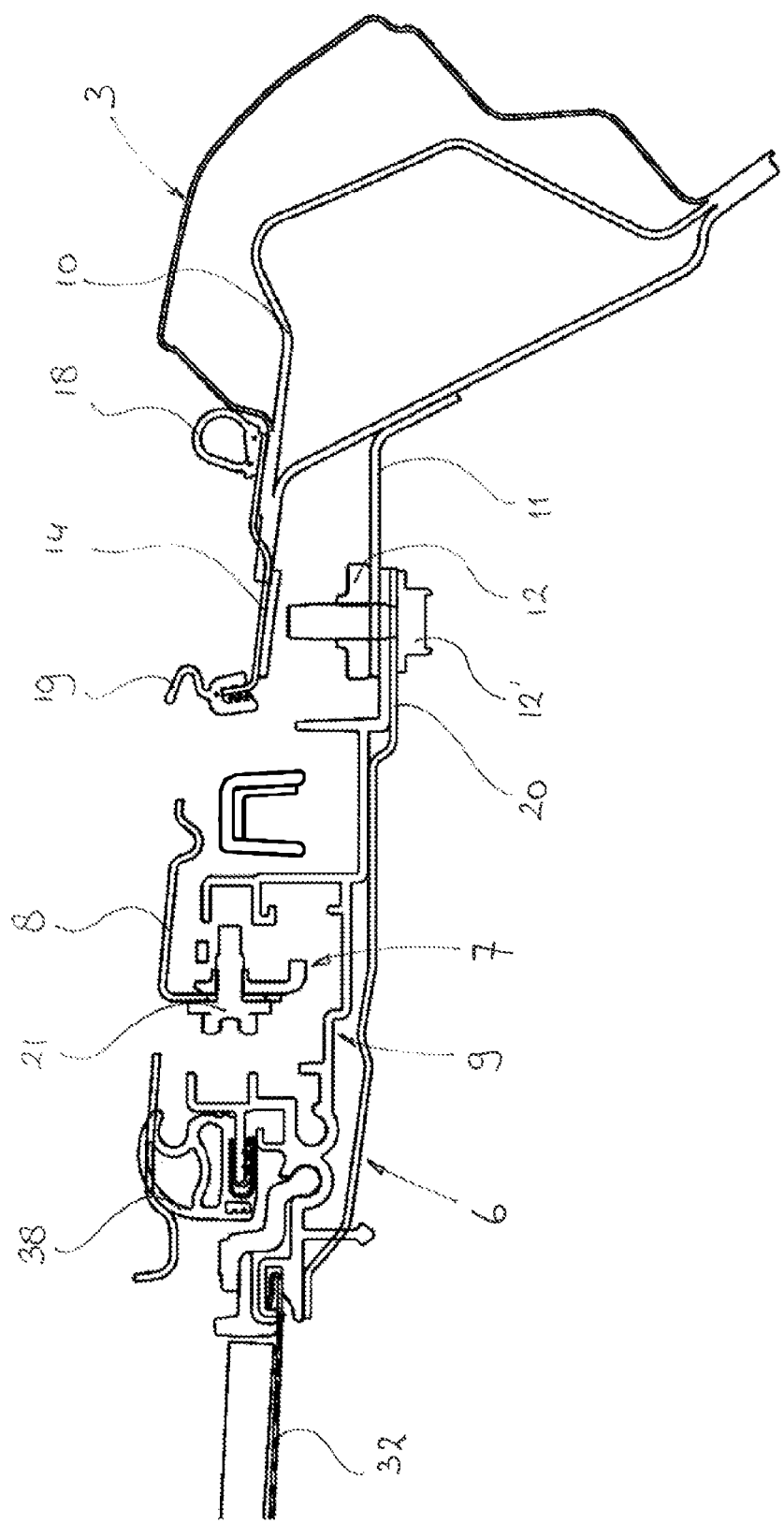

FIG. 4 shows that the frame 6 is attached to the fixed roof, i.e. side flanges 20 of frame 6 are bolted by bolts 12' to nuts 12 of the fixed roof flanges 11. It is also shown that ring frame 8 is attached to a part of operating mechanism 7, such as a lever or other vertically movable part, by means of a fixing member, here a screw 21. In this case, the attachment is preferably such that no adjustment between ring frame 8 and operating mechanism 7 is possible (and thus this attachment is accurate), so that the position of panel 4 is only adjusted by means of the attachment of panel 4 to ring frame 8.

As screw 21 is not used for adjusting the height of panel 4, it can be positioned such that it is below the upper edge of guide rail 9 and is shielded by adjacent upright flanges of the guide rail 9, so that it is not possible to reach the screw 21 when the panel 4 is in its closed position, as is shown in FIG. 4. This reduces package height of the operating mechanism or obviates the need for holes in the upright flanges of the guide rail 9 to be able to adjust the connection between ring frame 8 and operating mechanism 7 if the connection is between the flanges of the guide rail 9.

Figure 5:
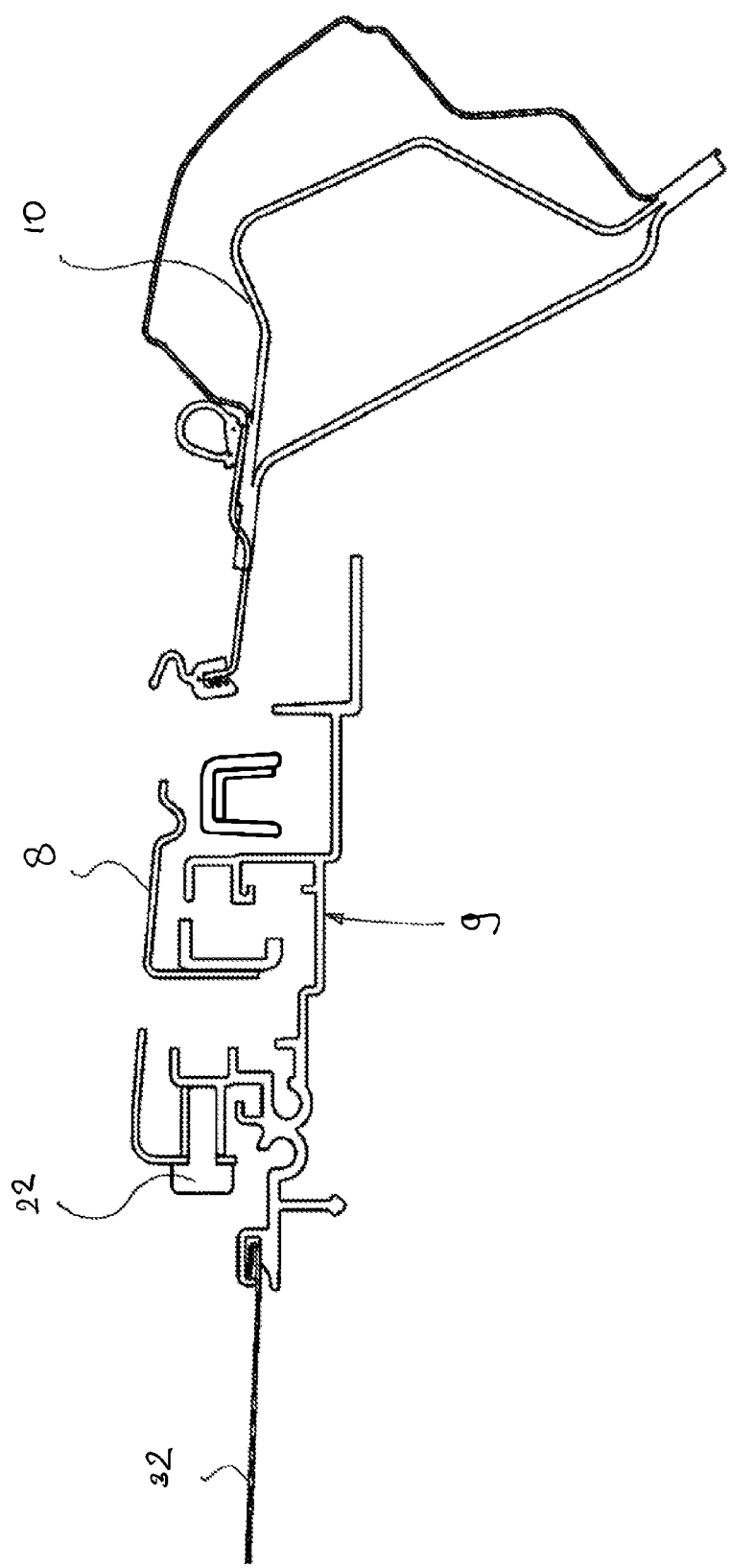

In FIG. 5 it is shown that a locking member 22, here in the form of a self-locking pin, is temporarily fixing the ring frame 8 of the operating mechanism 7 with respect to a flange of guide rail 9, so that ring frame 8 will maintain its position in horizontal and vertical directions when force is exerted onto ring frame 8 by panel 4. This makes the mounting process even more accurate.

Figure 6:
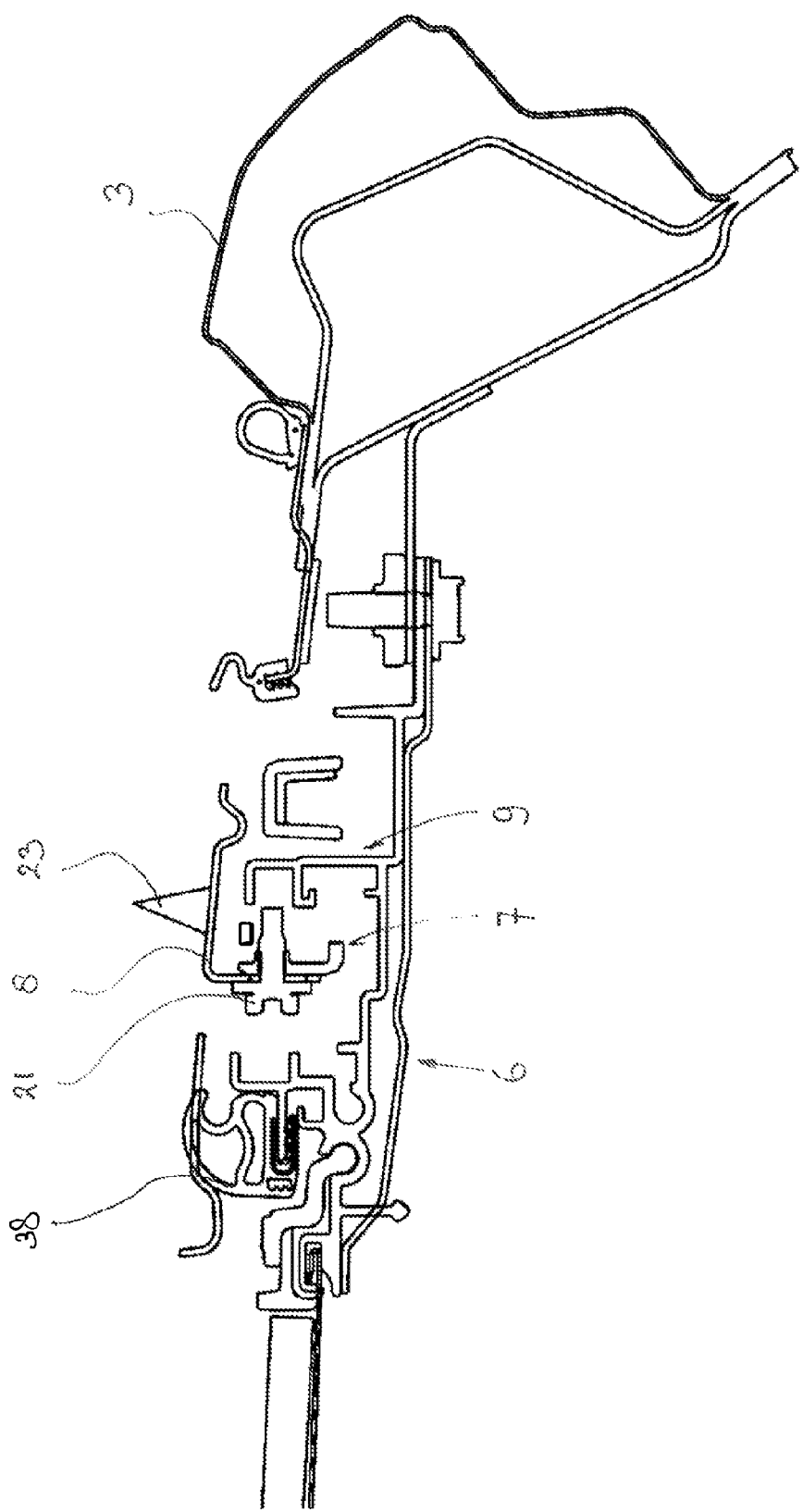

FIG. 6 illustrates that an amount of adhering material 23 is deposited on ring frame 8. Here it is done in the form of a continuous or discontinuous bead of paste-like glue, maintaining its shape when deposited, but being plastically deformable before it is cured. The thickness of the bead is sufficient to allow the panel to compress the bead in a substantial manner to spread the adhering material 23 over a larger area, and bring the thickness of the layer of adhering material within a range in which the adherence is optimal. For some glues, such as for example polyurethane (PU) based glue, the optimum thickness after assembly is around 2-3 mm, so that the position of the panel 4 on ring frame 8 may be adjusted to around 1 mm or so to obtain the correct position of panel 4 with respect to fixed roof 3 and still reach an optimum adherence.

Figure 7:
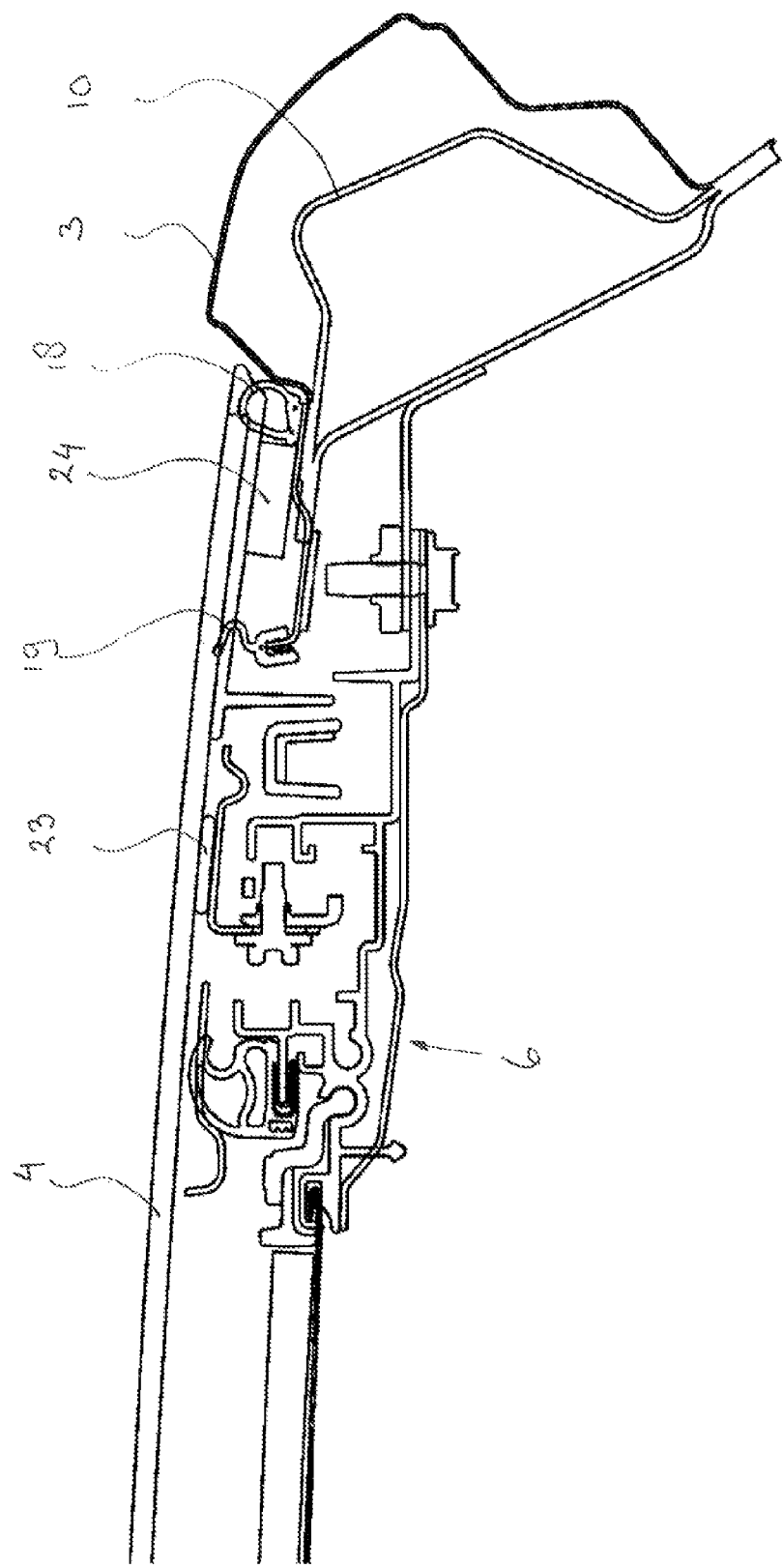

In FIG. 7, panel 4 is positioned on ring frame 8 with interposition of the compressed adhering material 23. As the operating mechanism is fixed in a position corresponding with the closed position of panel 4, seals 18 and 19 will be elastically compressed (not shown) such that they may provide a sealing function. Preferably a water management system is formed outside seals 18 and 19, so that no internal water management system is required in frame 6.

Due to the plastic compression of adhering material 23 and elastic compression of seals 18 and 19, a force must be exerted on panel 4 to maintain it in the correct position until the adhering material is cured sufficiently to hold the panel 4 in its correct position. This correct position can be obtained in several ways. In the embodiment shown, the panel 4 is provided with temporary spacers 24 which are attached to the lower side of panel 4 near the outer edge thereof, so that the spacers 24 will come to rest on the sub-frame 14 that is accurately attached to the fixed roof 3. Panel 4 is thus accurately positioned (vertically) with respect to the fixed roof 3. The spacers 24 stop the vertical downward movement of panel 4 and the adhering material 23 will absorb any inaccuracy in the height of frame 6 with respect to fixed roof 3.

Another method of positioning panel 4 accurately is measuring the position of panel 4 and adjusting the equipment holding panel 4 until the correct position is reached. This equipment may include an automated arm or robot arm, and wherein at the assumed correct position the automated arm or robot arm is unlocked from the panel 4, so as to leave the panel 4 in the correct position onto the ring frame 8.

Figure 8:
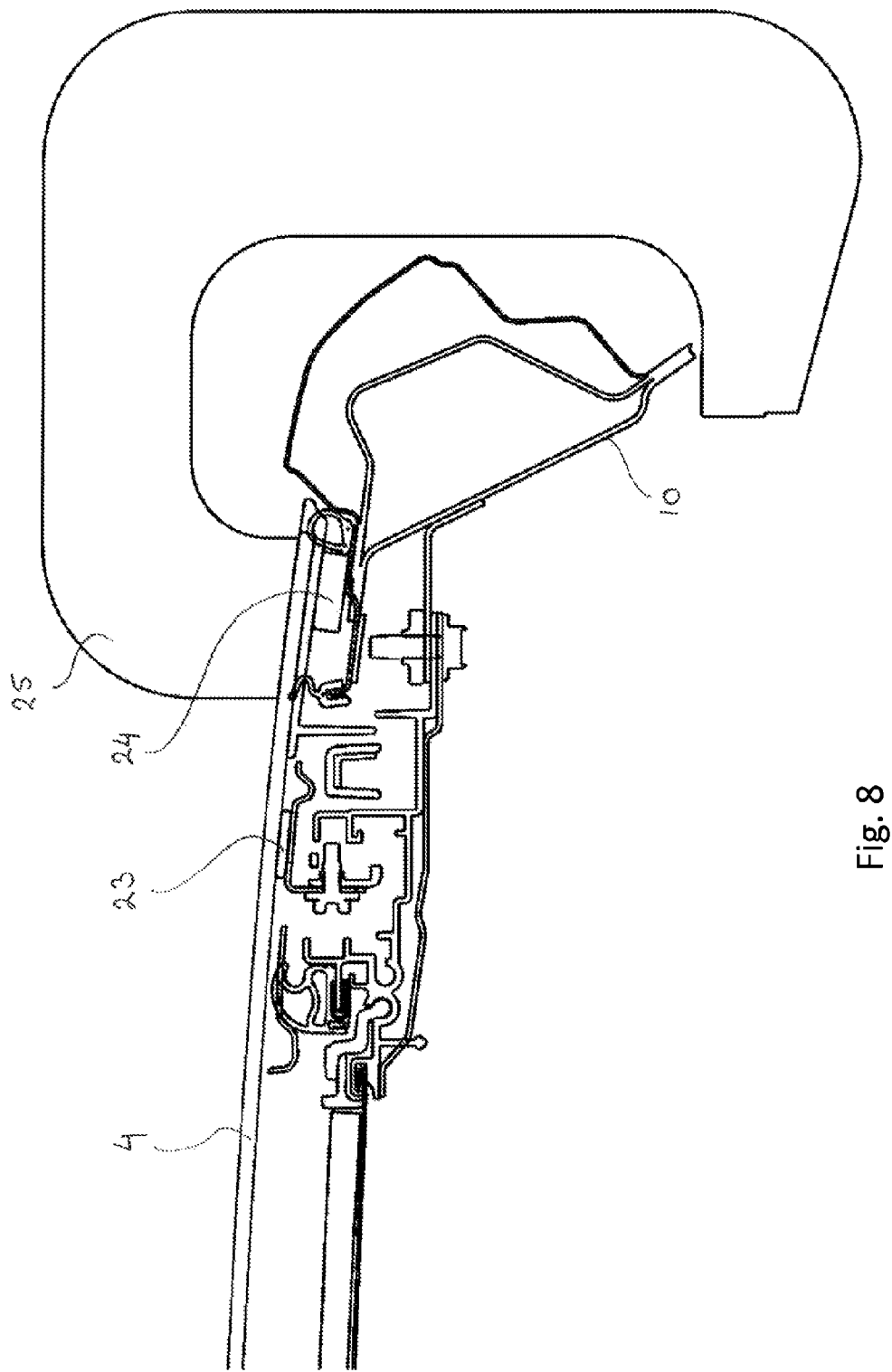

In FIG. 8 it is shown that one or more clamping devices 25 are used to maintain panel 4 in its correct position with respect to fixed roof 3 by clamping panel 4 onto spacers 24 until adhering material 23 is sufficiently cured. Adhering material 23 having a short curing time may be used, for example 30 minutes or less.

Figure 9:
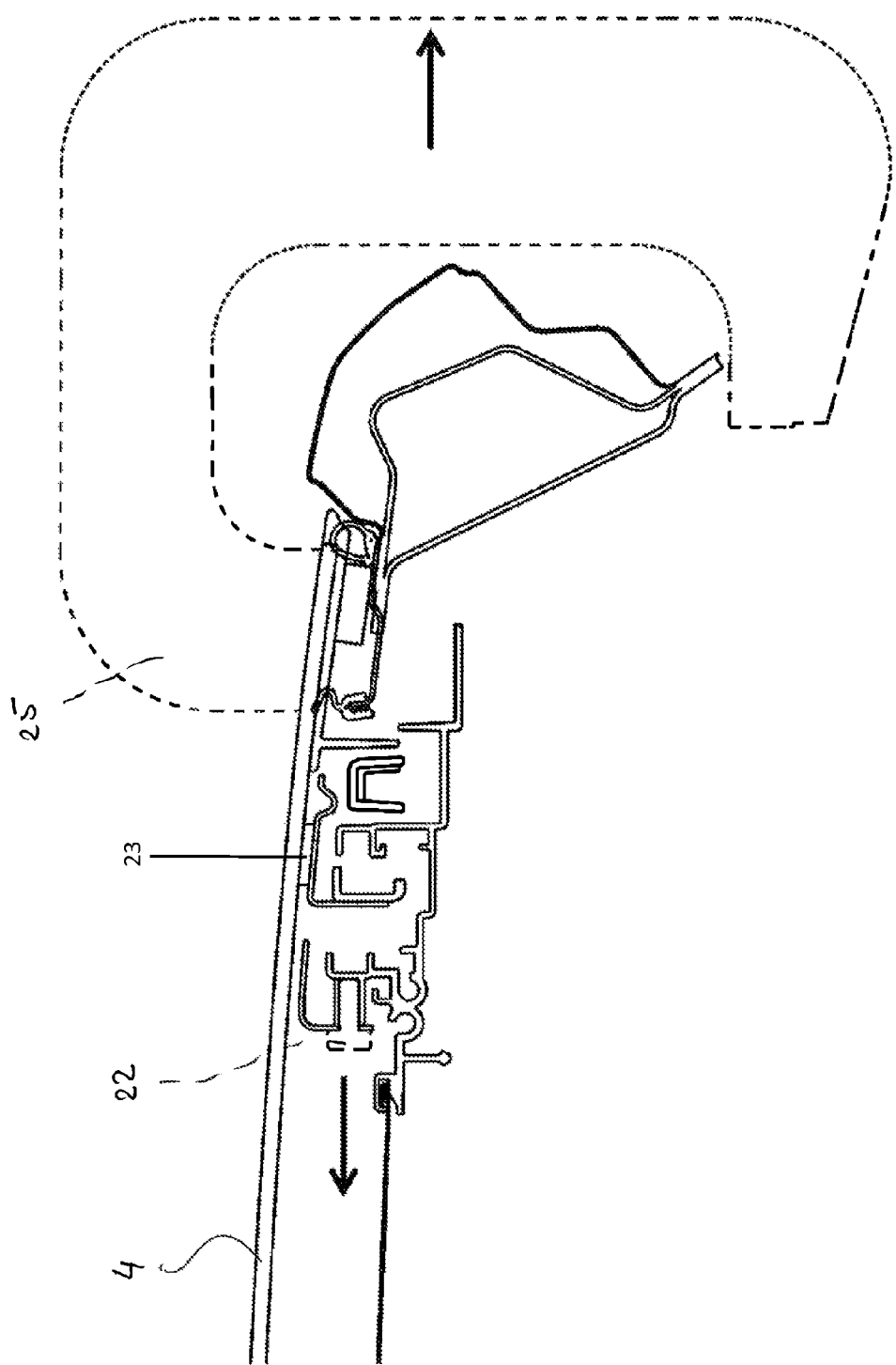

FIG. 9 shows the situation in which adhering material 23 is sufficiently cured, so that clamping device 25 and locking member 22 are removed.

Figure 10:
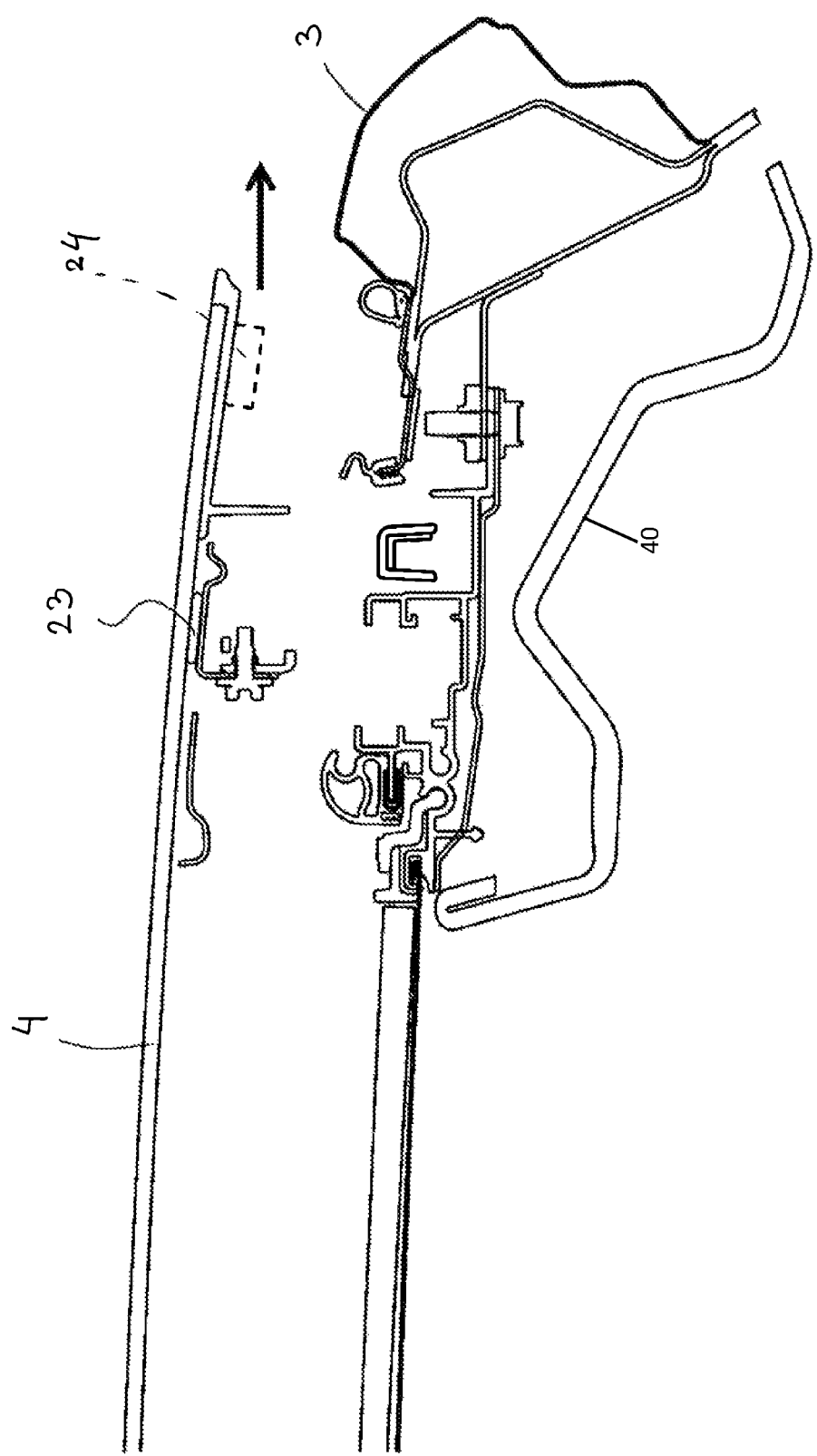

In FIG. 10 a headliner 40 has been attached to frame 6 of the roof panel assembly and to the fixed roof 3 of the vehicle in a manner not shown but known in the art. The operating mechanism has been operated in order to move panel 4 to an open position such that the spacers 24, which are temporarily attached to panel 4 can be reached and can be removed. It is noted that it is also conceivable to temporarily attach spacers 24 to sub-frame 8 instead of to panel 4.

Figure 11:
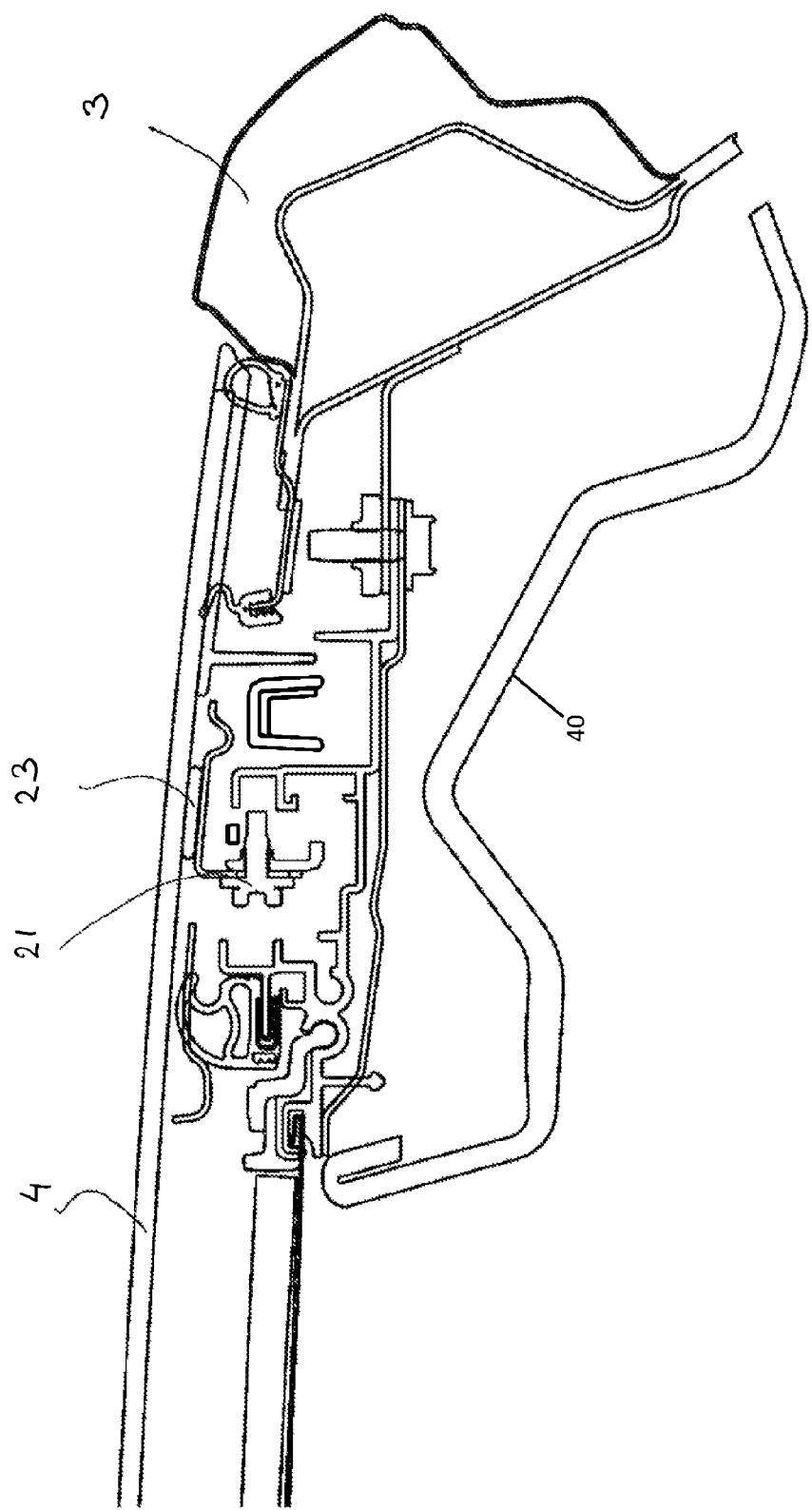

FIG. 11 shows the roof panel assembly in its finalized position with panel 4 closed again.

Figure 12:
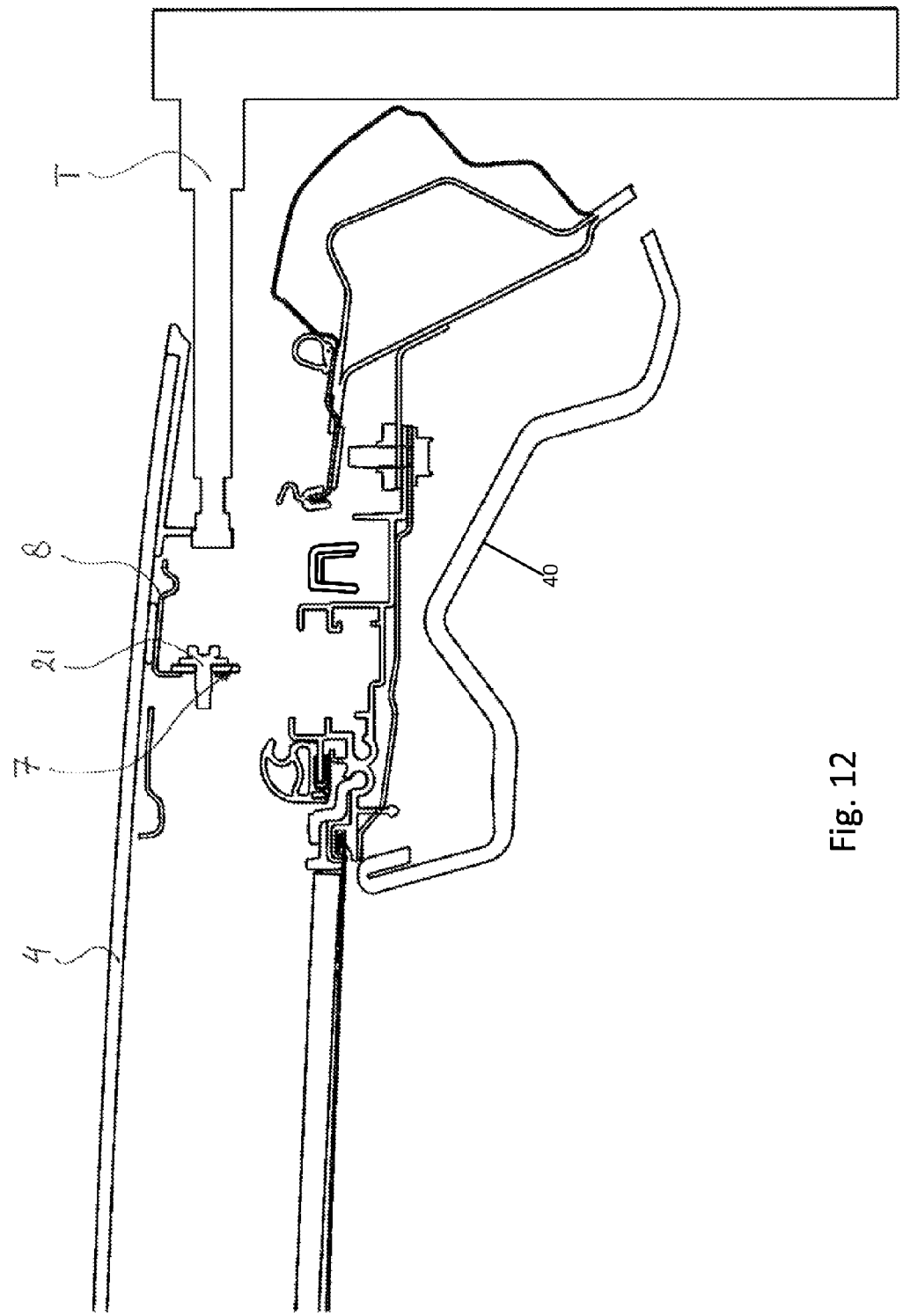

FIG. 12 shows an alternative arrangement of the connection between ring frame 8 and operating mechanism 7, i.e. the fixing screw 21 is positioned with its head away from the center of the vehicle, so that screw 21 can be loosened and tightened by means of a tool T from the outside of the vehicle in order to service the roof panel assembly, for example for replacing a panel 4 during its lifetime.

Figure 13:
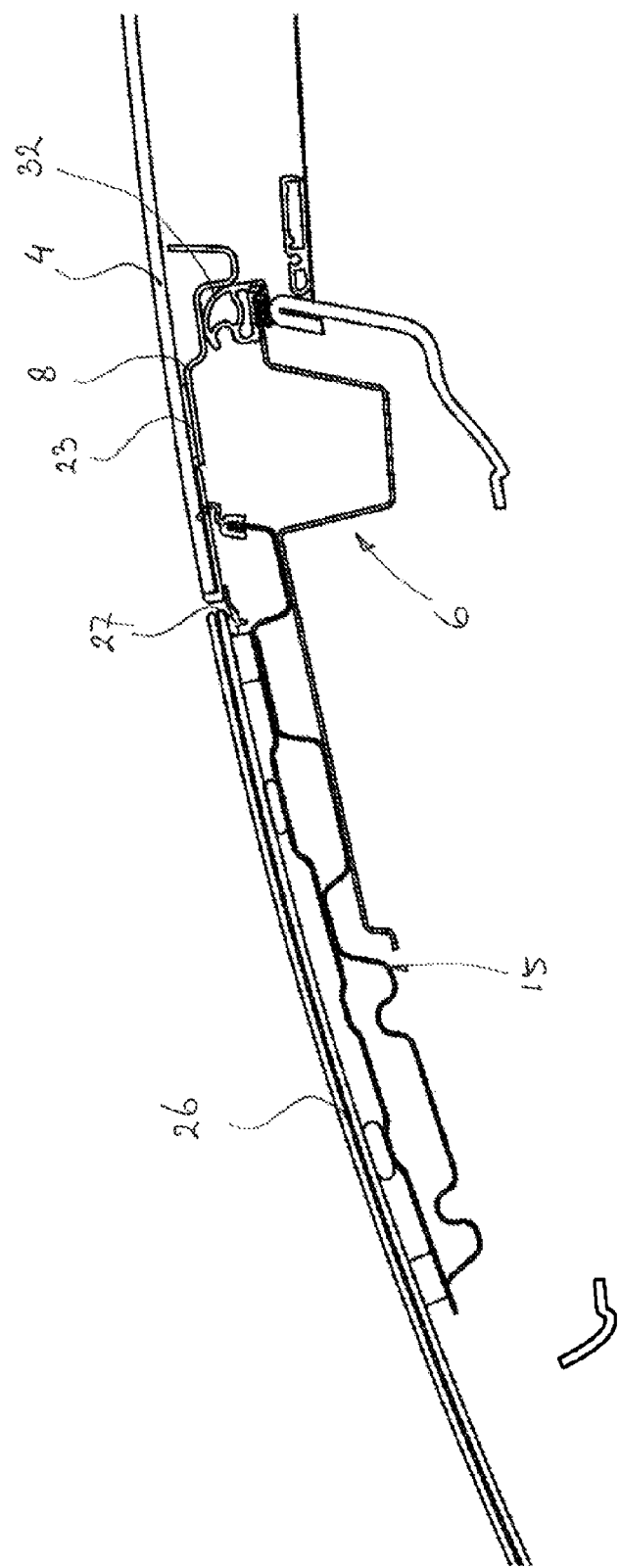
FIG. 13 is an enlarged sectional view according to the line XIII-XIII in FIG. 1.

FIG. 13 shows the front of panel 4 where it is aligned with a front windshield 26 of the vehicle, so that the upper surfaces thereof are substantially flush. A seal 27 is attached to the lower side of windshield 26 at its rear edge. This seal has a lip engaging the front side of front panel 4, such that windshield 26 is attached to the vehicle after movable panel 4 has been fixed to ring frame 8, and seal 27 thereby being automatically brought into engagement with the edge of panel 4.

Figure 14:
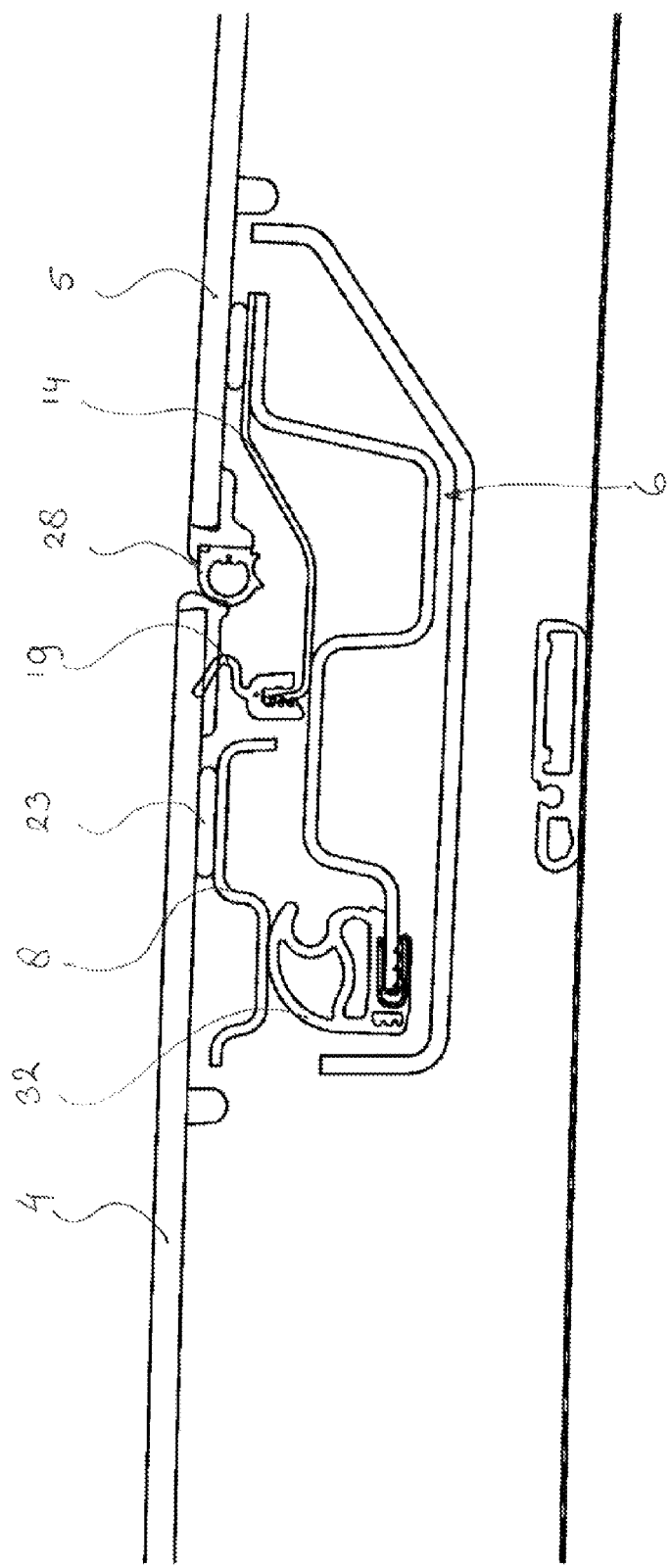
FIG. 14 is an enlarged sectional view according to the line XIV-XIV in FIG. 1.

FIG. 14 shows the situation at the rear edge of panel 4 where it engages the front side of fixed rear panel 5. As the rear edge of panel 4 engages a seal 28 at the circumference of panel 5 from above, the rear panel 5 is fixed first and then panel 4 is fixed to ring frame 8. In this figure it is shown that the rear edge of front panel 4 is slightly above the front edge of rear panel 5 which is favorable in view of aerodynamics.

Figure 15:
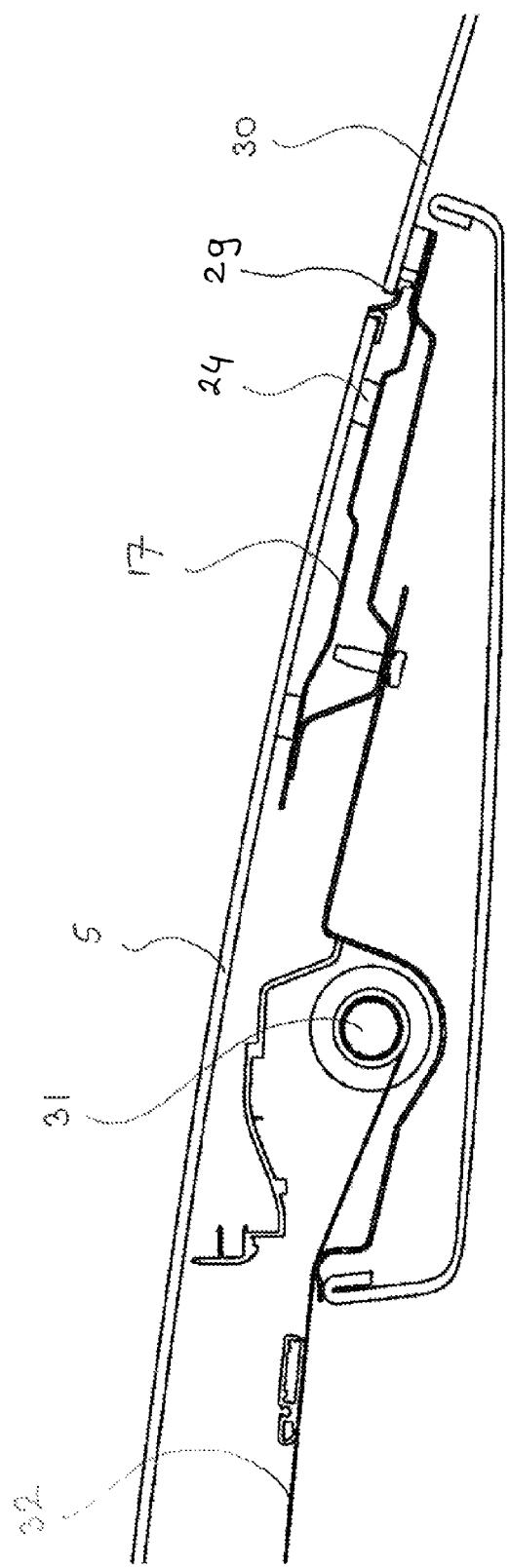
FIG. 15 is an enlarged sectional view according to the line XV-XV in FIG. 1.

FIG. 15 shows the situation at the rear edge of fixed rear panel 5 which is comparable to the front edge of front panel 4. A seal 29 is attached to the lower side of a rear window 30 and engages the rear edge of rear panel 5 from above, so that rear window 30 is fixed to the vehicle after rear panel 5 has been attached to the fixed roof 3. FIG. 15 further shows a winding shaft 31 of a roller blind 32 to shield the transparent rear panel 5. Such roller blind 32 may also be provided in the opening 1 of front panel 4.

Figure 16:
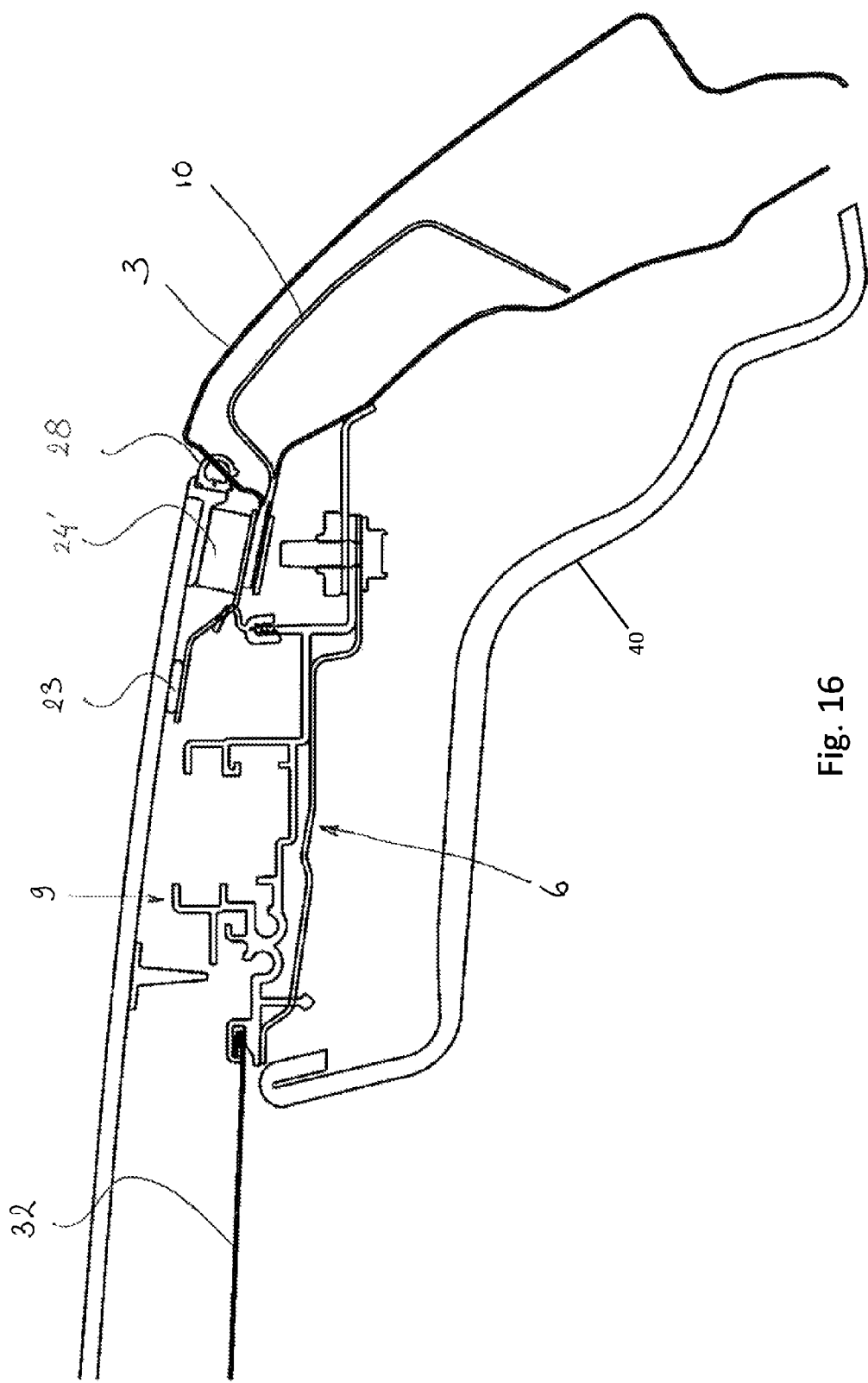
FIG. 16 is an enlarged sectional view according to the line XVI-XVI in FIG. 1.

FIG. 16 shows the attachment of rear panel 5 to fixed roof 1. Adhering material 23 is used to attach panel 5 to sub-frame 14 and permanent spacers 24' are used to support panel 5 at a correct height with respect to sub-frame 14 and fixed vehicle roof 3. Seal 28 on panel 5 engages fixed roof 3 and any water seeping through is guided away to the back of the vehicle where it runs off.

Figure 17:
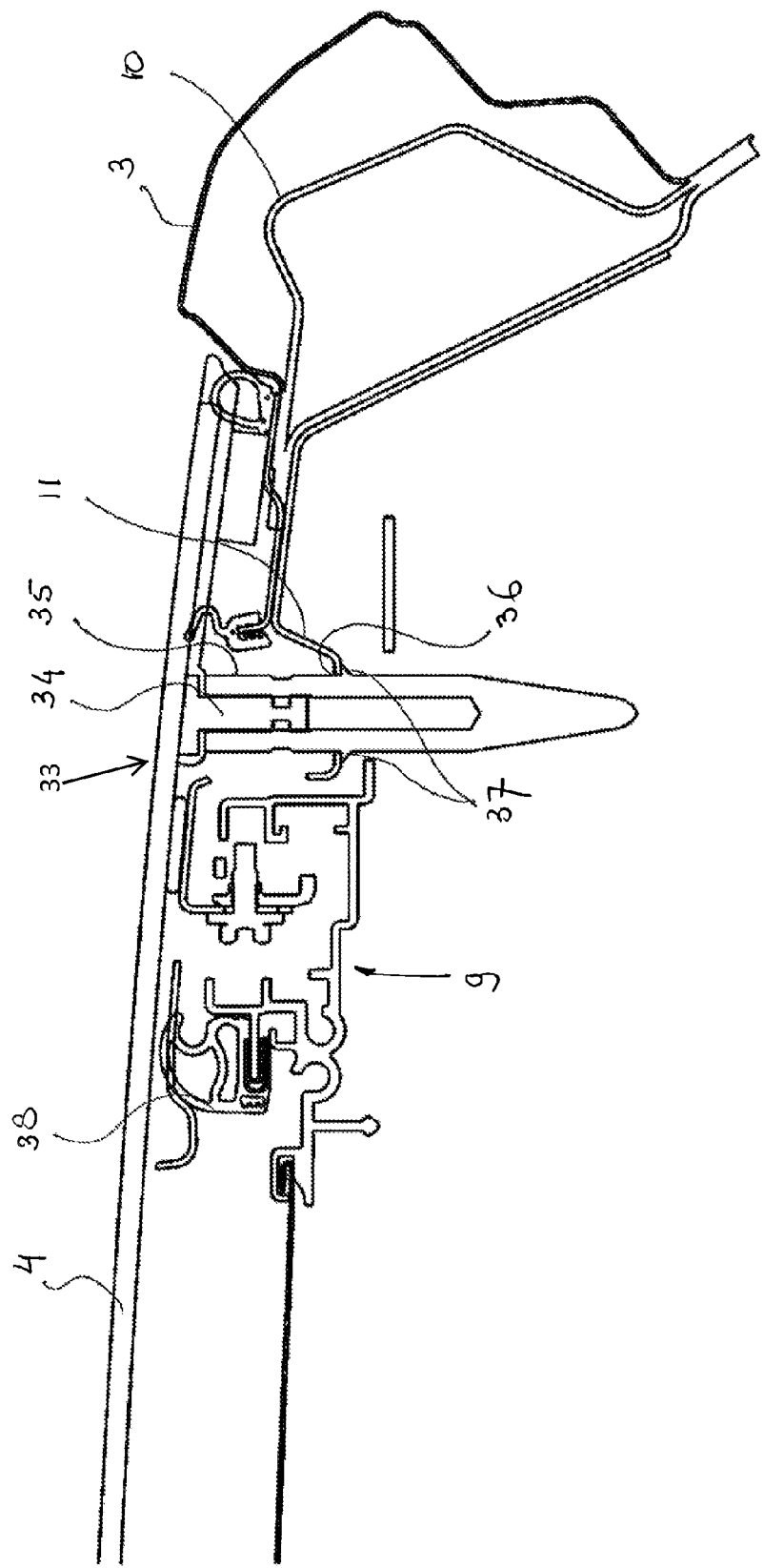
FIG. 17 is a view corresponding to that of FIG. 11 but showing an alternative embodiment of the roof panel assembly with additional positioning members.

FIG. 17 shows an alternative roof panel assembly having one or more additional locating or positioning members 33 to ensure a correct position of panel 4 with respect to fixed roof 3 at least in horizontal direction. In this case, there are three locating members 33 distributed around the circumference of panel 4 and of which one is shown in the drawing. Each locating member 33 comprises a pin 34 suspended vertically from the lower side of panel 4 and a sleeve 35 connected to the pin 34 with a bayonet-like connection (not shown). A fitting hole 36 is made in flange 11 of side beam 10 of fixed roof 3, the diameter of which is such that sleeve 35 precisely fits into it. The outer surface of sleeve 34 comprises small hooks 37 to lock sleeve 34 and therefore panel 4 in upward direction when panel 4 is mounted at its correct height, so that the sleeves can replace or supplement clamping devices 25 to hold panel 4 in position until adhering material 23 is cured sufficiently. After curing of adhering material 23, sleeve 35 is rotated to disconnect the sleeve 35 from pin 34, so that sleeve 35 can be removed in downward direction. Pin 34 may be removed, broken off or maintained in position. The locating pin 34, sleeve 35 and fitting hole 36 here have a circular cross section. The other holes not shown here may have other cross sections, as not all locating members should determine the position of panel 4 in all directions. This would make the structure overdetermined. The other fitting holes could be elongated (only locating in two directions) and oversized (only locating in upward direction). This method of positioning panel 4 can be used in addition to or as a replacement to other positioning methods.

Also shown, for example in FIGS. 4 and 14 is a seal 38 at the inner circumference of frame 6 around opening 1. This seal 38 cooperates with the lower side of ring frame 8 in order to acoustically and optically isolate the passenger cabin from the space above frame 6.

It follows from the above that aspects of the invention provide a roof panel assembly mounting process that is efficient, cost effective and accurate. Short waiting times are obtained, while especially the movable panel is mounted in an accurate position despite the fact that it is only mounted to the remainder of the panel roof assembly when it already mounted to the vehicle. No readjustment after mounting is necessary.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A method of mounting a roof panel assembly to a vehicle having a roof opening in a fixed roof to a passenger compartment, said roof panel assembly comprising a frame, a rigid movable panel supported by the frame through an operating mechanism carrying a closed loop frame, enabling the movable panel to move between a panel closed position closing the roof opening and an open position opening the roof opening at least partly, said method comprising:

mounting the frame of the roof panel assembly to the fixed roof of the vehicle from below and inside the passenger compartment with the operating mechanism and the closed loop frame in an operating mechanism closed position corresponding to the panel closed position of the movable panel;

providing an amount of paste-like adhering material onto the closed loop frame distributed around a circumference thereof;

positioning the movable panel onto the closed loop frame from above and outside the passenger compartment with the adhering material interpositioned and thereby substantially plastically compressing the adhering material until a correct position with respect to the vehicle roof is reached;

keeping the movable panel in the correct position until the adhering material is sufficiently hardened to maintain the movable panel in the correct position;

determining a correct height of the movable panel using spacers provided between the movable panel and the fixed roof; and after hardening of the adhering material, opening the movable panel with the operating mechanism to a position in which the spacers are removed.

2. The method according to claim 1, and further comprising fixing a sub-frame to the vehicle roof before the roof panel assembly is fixed to the fixed roof.

3. The method according to claim 2, wherein a sealing member is positioned between a circumferential edge of the movable panel and the vehicle roof when the movable panel is in the panel closed position, the sealing member being compressed when the movable panel is maintained in the correct height position using a clamp, and wherein the sealing member is fixed to the sub-frame.

4. The method according to claim 1, and further comprising fixing a front wind shield and a rear wind shield to the vehicle with a wind shield adhering material, and fixing a stationary panel to the vehicle with the wind shield adhering material.

5. The method according to claim 4, wherein the rear wind shield is fixed to the vehicle after the stationary panel has been fixed, and the front wind shield is fixed to the vehicle after the movable panel has been fixed.

6. The method according to claim 1, and further determining the correct height position by measuring the position of the movable panel when it is positioned onto the closed loop frame.

7. The method according to claim 1, wherein the operating mechanism is additionally locked in the operating mechanism closed position with a locking member maintaining a position of the closed loop frame during placement of the movable panel onto the closed loop frame.

8. The method according to claim 1, wherein a sealing member is positioned between a circumferential edge of the movable panel and the vehicle roof when the movable panel is in the panel closed position, the sealing member being compressed when the movable panel is maintained in the correct height position using a clamp.

9. The method according to claim 1, wherein keeping the movable panel in position includes using at least one clamping device to clamp the movable panel with regard to the fixed roof until the adhering material is sufficiently hardened.

10. The method according to claim 1, wherein keeping the movable panel in position includes using locating members fixed to the movable panel and fitting into fitting holes in the fixed roof until the adhering material is sufficiently hardened.

11. A method of mounting a roof panel assembly to a vehicle having a roof opening in a fixed roof to a passenger compartment, said roof panel assembly comprising a frame, a rigid movable panel supported by the frame through an operating mechanism carrying a closed loop frame, enabling the movable panel to move between a panel closed position closing the roof opening and an open position opening the roof opening at least partly, said method comprising:

mounting the frame of the roof panel assembly to the fixed roof of the vehicle from below and inside the passenger compartment with the operating mechanism and the closed loop frame in an operating mechanism closed position corresponding to the panel closed position of the movable panel;

providing an amount of paste-like adhering material onto the closed loop frame distributed around a circumference thereof;

positioning the movable panel onto the closed loop frame from above and outside the passenger compartment with the adhering material interpositioned and thereby substantially plastically compressing the adhering material until a correct position with respect to the vehicle roof is reached;

keeping the movable panel in the correct position until the adhering material is sufficiently hardened to maintain the movable panel in the correct position;

wherein the operating mechanism is additionally locked in the operating mechanism closed position with a locking member maintaining a position of the closed loop frame during placement of the movable panel onto the closed loop frame; and after hardening of the adhering material, removing the locking member.

12. The method according to claim 11, wherein the locking member is a pin inserted into a hole through a wall of a stationary guide rail of the frame and a hole in the closed loop frame to lock the closed loop frame with respect to the stationary guide rail.

13. The method according to claim 12, wherein removing the locking member comprises removing the locking member towards the passenger compartment.

14. The method according to claim 11, and further comprising fixing a sub-frame to the vehicle roof before the roof panel assembly is fixed to the fixed roof.

15. The method according to claim 14, wherein a sealing member is positioned between a circumferential edge of the movable panel and the vehicle roof when the movable panel is in the panel closed position, the sealing member being compressed when the movable panel is maintained in the correct height position using a clamp, and wherein the sealing member is fixed to the sub-frame.

16. The method according to claim 11, and further comprising: determining a correct height of the movable panel using spacers provided between the movable panel and the fixed roof.

17. The method according to claim 11, and further determining the correct height position by measuring the position of the movable panel when it is positioned onto the closed loop frame.

18. The method according to claim 11, wherein a sealing member is positioned between a circumferential edge of the movable panel and the vehicle roof when the movable panel is in the panel closed position, the sealing member being compressed when the movable panel is maintained in the correct height position using a clamp.

19. The method according to claim 11, and further comprising fixing a front wind shield and a rear wind shield to the vehicle with a wind shield adhering material, and fixing a stationary panel to the vehicle with the wind shield adhering material.

20. The method according to claim 11, wherein keeping the movable panel in position includes using locating members fixed to the movable panel and fitting into fitting holes in the fixed roof until the adhering material is sufficiently hardened.

* * * * *